United States Patent
Hsiao et al.

(10) Patent No.: US 9,971,510 B2
(45) Date of Patent: May 15, 2018

(54) METHOD FOR MANAGING MEMORY AND ASSOCIATED MICROCONTROLLER

(71) Applicant: MEDIATEK INC., Hsin-Chu (TW)

(72) Inventors: Chih-Hsiang Hsiao, Taipei (TW); Chi-Hsuan Lin, New Taipei (TW); Chieh-Lin Chuang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 30 days.

(21) Appl. No.: 15/294,779

(22) Filed: Oct. 16, 2016

(65) Prior Publication Data
US 2018/0107399 A1  Apr. 19, 2018

(51) Int. Cl.
*G06F 3/06* (2006.01)
*G06F 12/128* (2016.01)

(52) U.S. Cl.
CPC ......... *G06F 3/0607* (2013.01); *G06F 3/0625* (2013.01); *G06F 3/0653* (2013.01); *G06F 3/0685* (2013.01); *G06F 12/128* (2013.01); *G06F 2212/69* (2013.01)

(58) Field of Classification Search
CPC .... G06F 3/0607; G06F 3/0685; G06F 3/0653; G06F 3/0625; G06F 12/128
See application file for complete search history.

(56) References Cited

U.S. PATENT DOCUMENTS

2011/0197045 A1*  8/2011  Okamoto ............ G06F 12/0246
                                                      711/166
2012/0254530 A1   10/2012  Tagaya
2016/0011818 A1*  1/2016  Hashimoto ........ G11C 16/3495
                                                      711/103

FOREIGN PATENT DOCUMENTS

CN        1489334 A      4/2004
TW       201516679 A     5/2015

* cited by examiner

*Primary Examiner* — Mohammed A Bashar
(74) *Attorney, Agent, or Firm* — Winston Hsu

(57) ABSTRACT

A microcontroller includes a processor, a memory, a working space management unit and a memory monitor. The memory has at least a working space, wherein the working space includes a plurality of blocks. The working space management unit is implemented by software, and is arranged for managing the working space of the first memory. The memory monitor is implemented by hardware circuit, and is arranged for monitoring the blocks, and recording monitoring results corresponding to the blocks of the first memory, wherein the recorded monitoring results comprise information about whether data of the blocks is modified or not.

18 Claims, 7 Drawing Sheets

METHOD FOR MANAGING MEMORY AND ASSOCIATED MICROCONTROLLER

BACKGROUND

For an embedded microcontroller (MCU) system, because cache memory (e.g. static random access memory (SRAM)) is expensive, a large/slower/higher power memory such as dynamic random access memory (DRAM) is generally used with the cache to provide large memory space; however, this arrangement costs much power consumption. Furthermore, regarding the cache technique, a hardware cache implementation needs higher costs, and a pure software cache costs power and computing resources. Therefore, how to provide a memory management method to have lower cost and lower power consumption is an important topic.

SUMMARY

It is therefore an objective of the present invention to provide a memory management method, which uses a small circuit to assist the software cache, to solve the above-mentioned problem.

According to one embodiment of the present invention, a microcontroller includes a processor, a memory, a working space management unit and a memory monitor. The memory has at least a working space, wherein the working space includes a plurality of blocks. The working space management unit is implemented by software, and is arranged for managing the working space of the first memory. The memory monitor is implemented by hardware circuit, and is arranged for monitoring the blocks, and recording monitoring results corresponding to the blocks of the first memory, wherein the recorded monitoring results comprise information about whether data of the blocks is modified or not.

According to another embodiment of the present invention, a method for managing a first memory is provided, wherein the first memory has at least a working space comprising a plurality of blocks, and the method comprises: using a hardware circuit to monitor the blocks; and recording monitoring results corresponding to the blocks of the first memory, wherein the recorded monitoring results comprise information about whether data of the blocks is modified or not.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
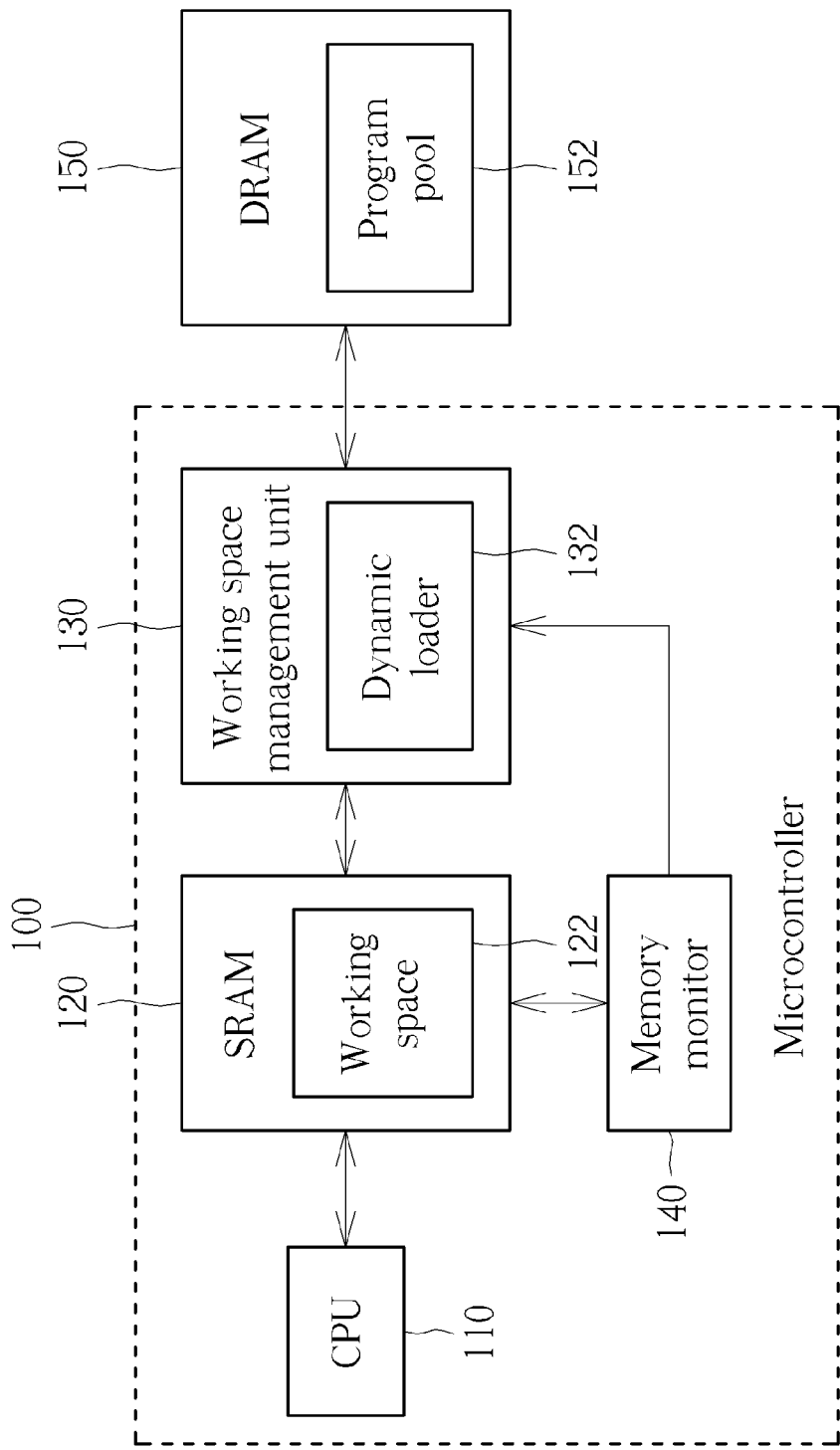
FIG. 1 is a diagram illustrating a microcontroller according to one embodiment of the present invention.

Please refer to FIG. 1, which is a diagram illustrating a microcontroller (MCU) 100 according to one embodiment of the present invention. As shown in FIG. 1, the microcontroller 100 comprises a Central Processing Unit (CPU) 110, a memory such as a SRAM 120, a working space management unit 130 and a memory monitor 140, where the SRAM 120 comprises at least a working space 122, and the working space management unit 130 comprises at least a dynamic loader 132. In this embodiment, the working space management unit 130 is used to manage the working space 122, and the working space management unit 130 is implemented by pure software (that is, the operations of the working space management unit 130 is performed by executing program codes); and the memory monitor 140 is implemented by hardware circuit (e.g. functional circuits, logic gates and registers . . . etc.).

The microcontroller 100 is coupled to a DRAM 150 having a program pool 152, and the microcontroller 100 loads objects from the program pool 152 to execute the corresponding functions, where the term "object" is a collection of code or data for specific functionality, and is able to be linked and loaded to the SRAM 120 to be executed. In detail, the dynamic loader 132 of the working space management unit 130 loads the objects from the program pool 152 to the working space 122 of the SRAM 122, and the CPU 110 reads and executes the loaded objects in the working space 122. In addition, during the working period of the microcontroller 100, the memory monitor 140 dynamically monitors and records the statuses of the objects stored in the working space 122 in real-time, and the working space management unit 130 refers to the recorded statuses of the objects to control/adjust the management strategy to the SRAM 120.

Figure 2:
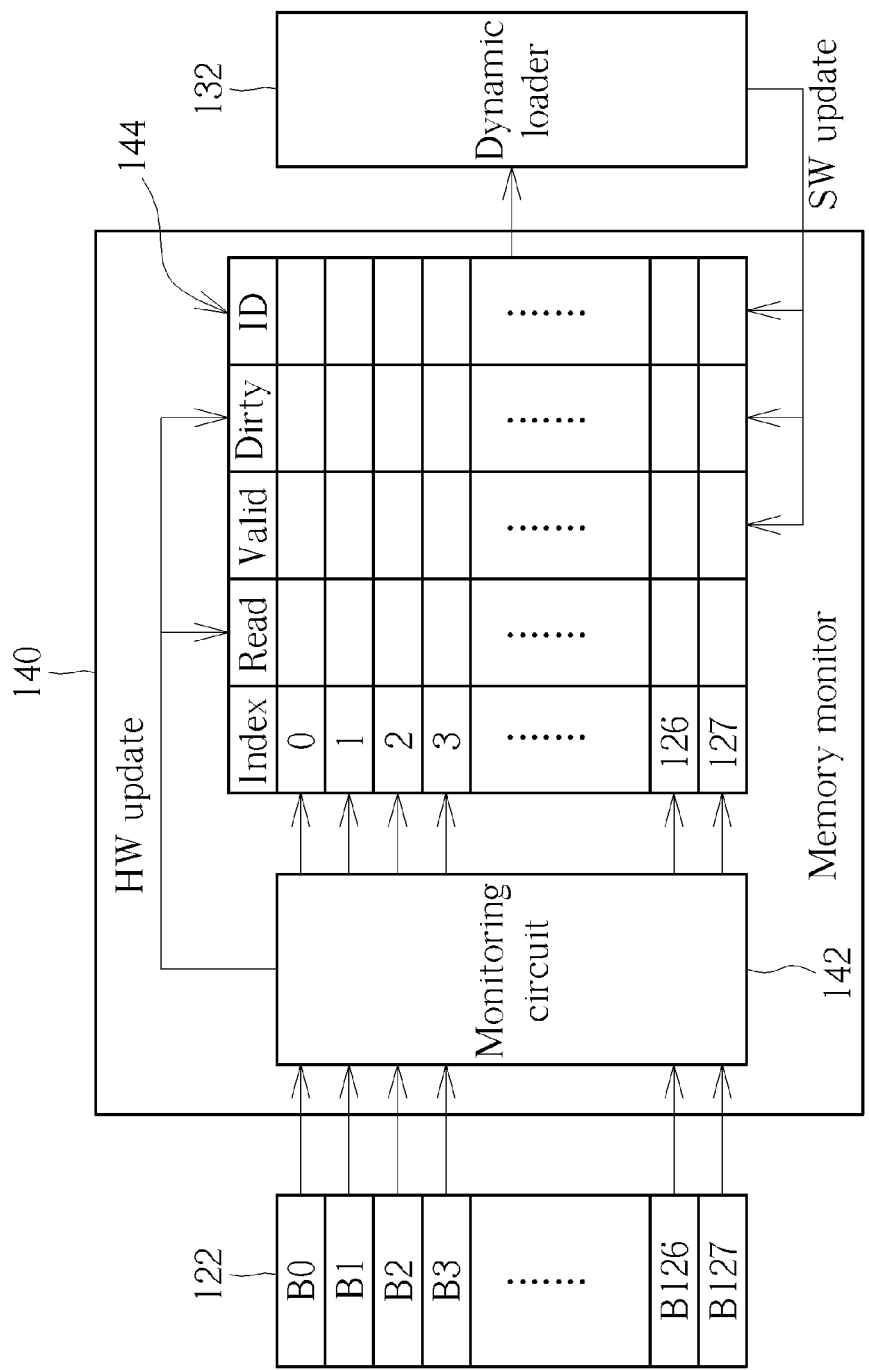
FIG. 2 is a diagram illustrating the working space, the memory monitor and the dynamic loader according to one embodiment of the present invention.

Please refer to FIG. 2, which is a diagram illustrating the working space 122, the memory monitor 140 and the dynamic loader 132 according to one embodiment of the present invention. As shown in FIG. 2, the working space 122 is divided into a plurality of blocks B0-B127, the memory monitor 140 comprises a monitoring circuit 142 and a plurality of registers 144, where the registers 144 are used to record the statuses of the blocks B0-B127. In this embodiment, each of the blocks B0-B127 has read information, valid information, dirty information and identity (ID) information, where the read information indicates that whether data within the block is read by the CPU 110 or not, for example, the read information has a logical value "0" when the data within the block has not been read by the CPU 110, and the read information has a logical value "1" when the data within the block has been read by the CPU 110; the valid information indicates that whether the block is empty or occupied by the data, for example, the valid information has a logical value "0" when the block is empty, and the valid information has a logical value "1" when the block is not empty; the dirty information indicates that whether the data within the block is modified/updated by the CPU 110 or not, for example, the dirty information has a logical value "0" when the data within the block is not modified/updated, and the dirty information has a logical value "1" when the data within the block is modified/updated; and the ID information indicates that which the object (data) stored in the block belongs to.

In this embodiment, the read information of the blocks B0-B127 are updated by the monitoring circuit 142 (i.e. hardware (HW) update); the valid information and the ID information of the blocks B0-B127 are updated by the dynamic loader 132 (i.e. software (SW) update); and the dirty information of the blocks B0-B127 are updated by the monitoring circuit 142 or the dynamic loader 132 according to different situations.

Figure 3:
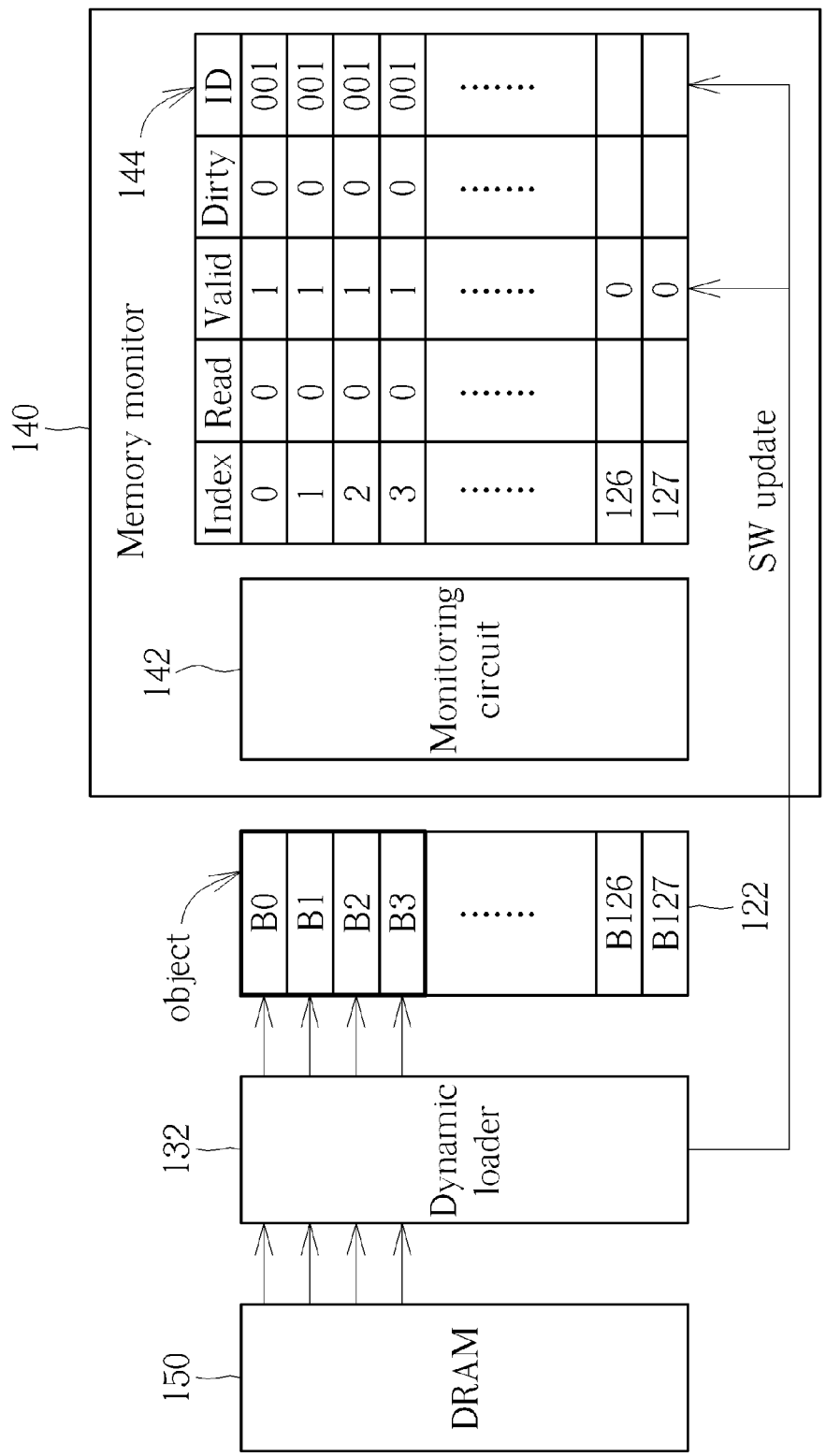
FIG. 3 is a diagram illustrating the operations of the dynamic loader when the object is loaded to the SRAM according to one embodiment of the present invention.

FIGS. 3-6 are diagrams illustrating operations of the microcontroller 100 according to one embodiment of the present invention. Referring to FIG. 3 first, the dynamic loader 132 loads an object from the DRAM 150, and the loaded object is stored into the blocks B0-B3 of the working space 122. Meanwhile, the dynamic loader 132 updates the valid information and the ID information corresponding to the blocks B0-B3, for example, the valid information of the blocks B0-B3 are changed from "0" to "1", and the ID information is updated to be "001".

Figure 4:
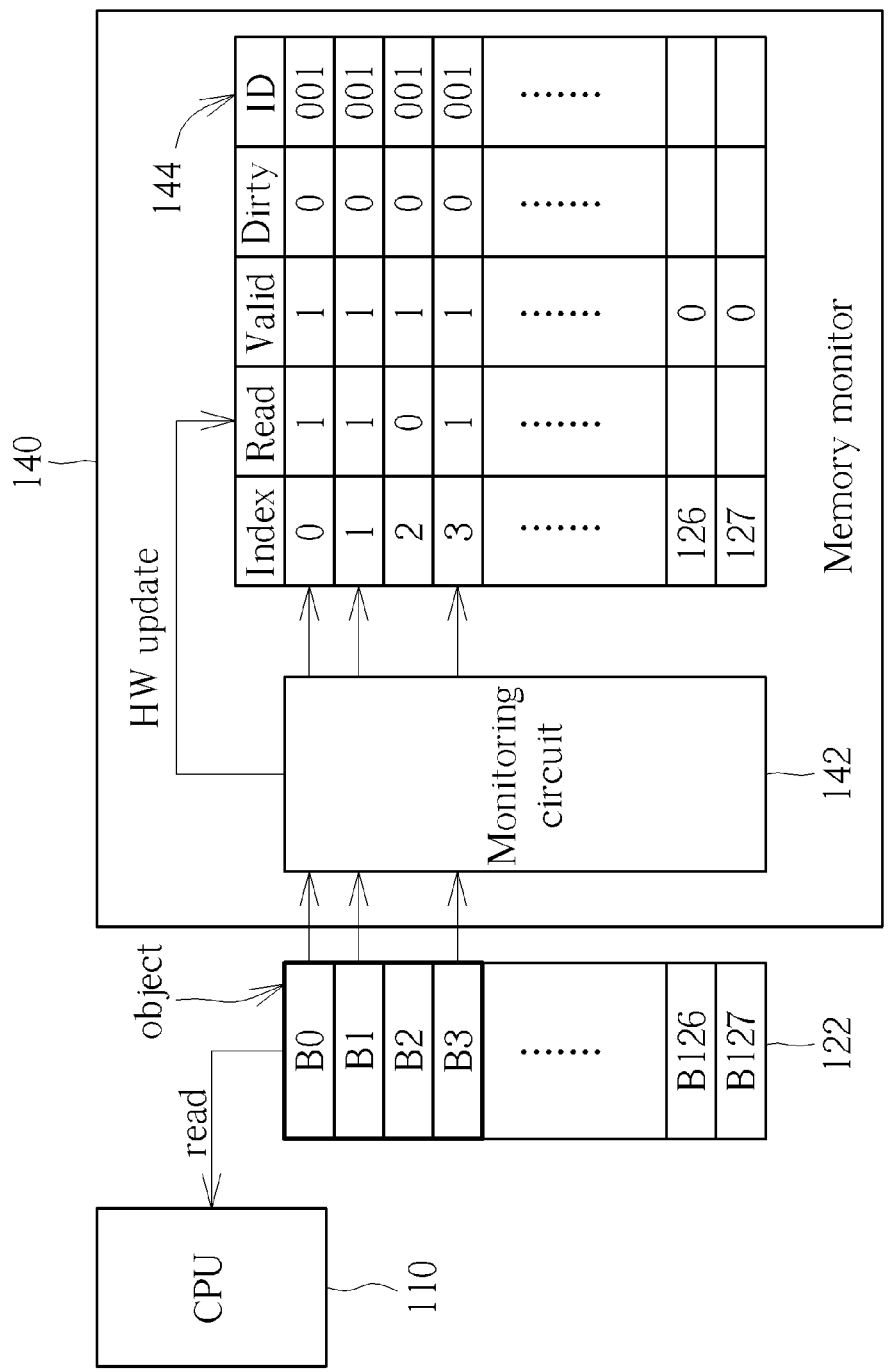
FIG. 4 is a diagram illustrating the operations of the memory monitor when the CPU reads the object according to one embodiment of the present invention.

FIG. 4 is a diagram illustrating the operations of the memory monitor 140 when the CPU 110 reads the object according to one embodiment of the present invention. Referring to FIG. 4, the CPU 110 only reads a portion of the objects (e.g., the blocks B0, B1 and B3), and the monitoring circuit 142 can monitor/intercept read signals within the SRAM 120 (e.g. the read request from the CPU 110) to update the read information of the blocks B0, B1 and B3.

Figure 5:
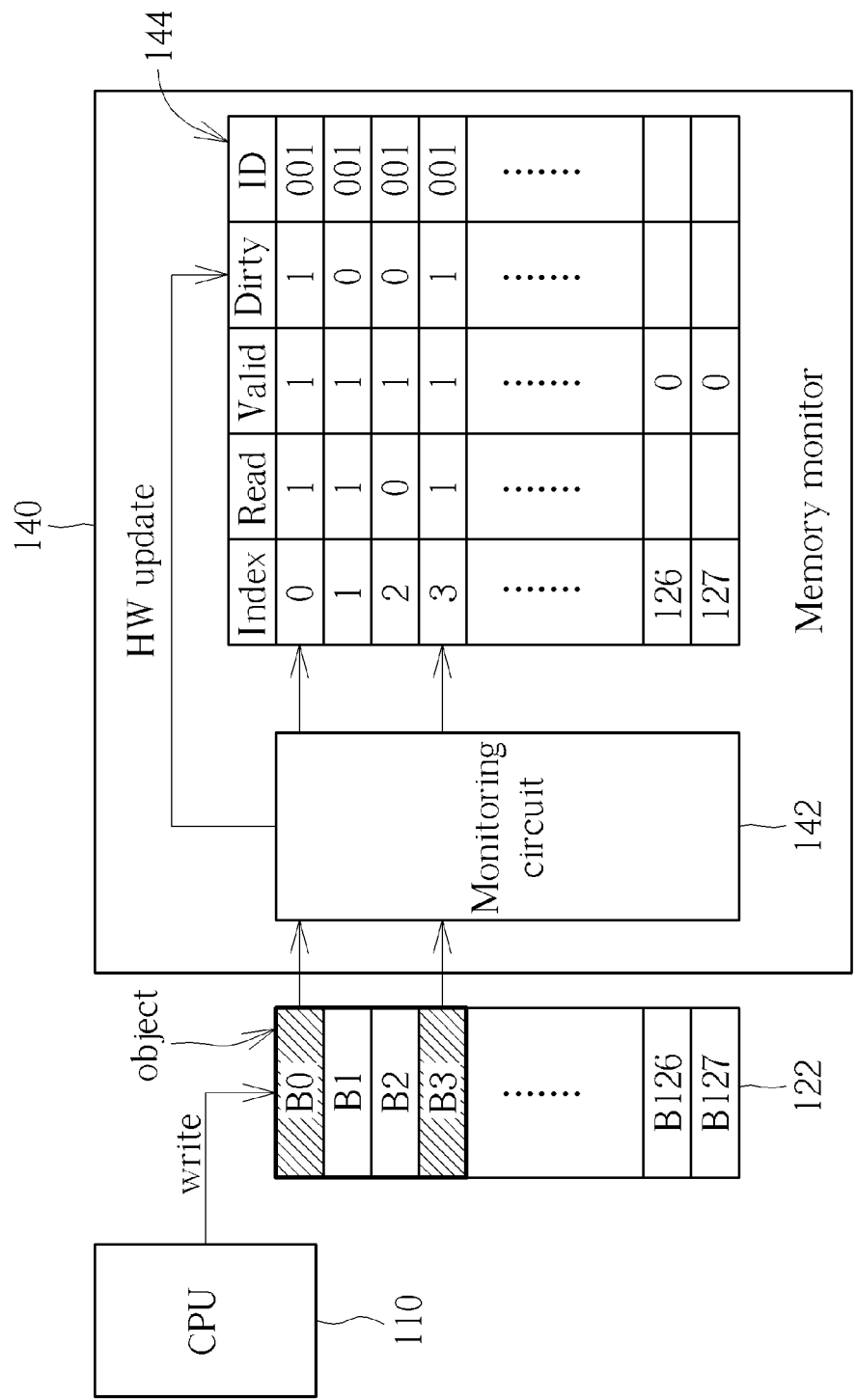
FIG. 5 is a diagram illustrating the operations of the memory monitor when the CPU writes data into the blocks B0 and B3 according to one embodiment of the present invention.

FIG. 5 is a diagram illustrating the operations of the memory monitor 140 when the CPU 110 writes data into the blocks B0 and B3 according to one embodiment of the present invention. Referring to FIG. 5, the CPU 110 writes data into the blocks B0 and B3 (i.e., the contents of blocks B0 and B3 are modified/updated), and the monitoring circuit 142 monitor/intercept write signals within the SRAM 120 (e.g. the write request from the CPU 110) to update the dirty information of the blocks B0 and B3.

Figure 6:
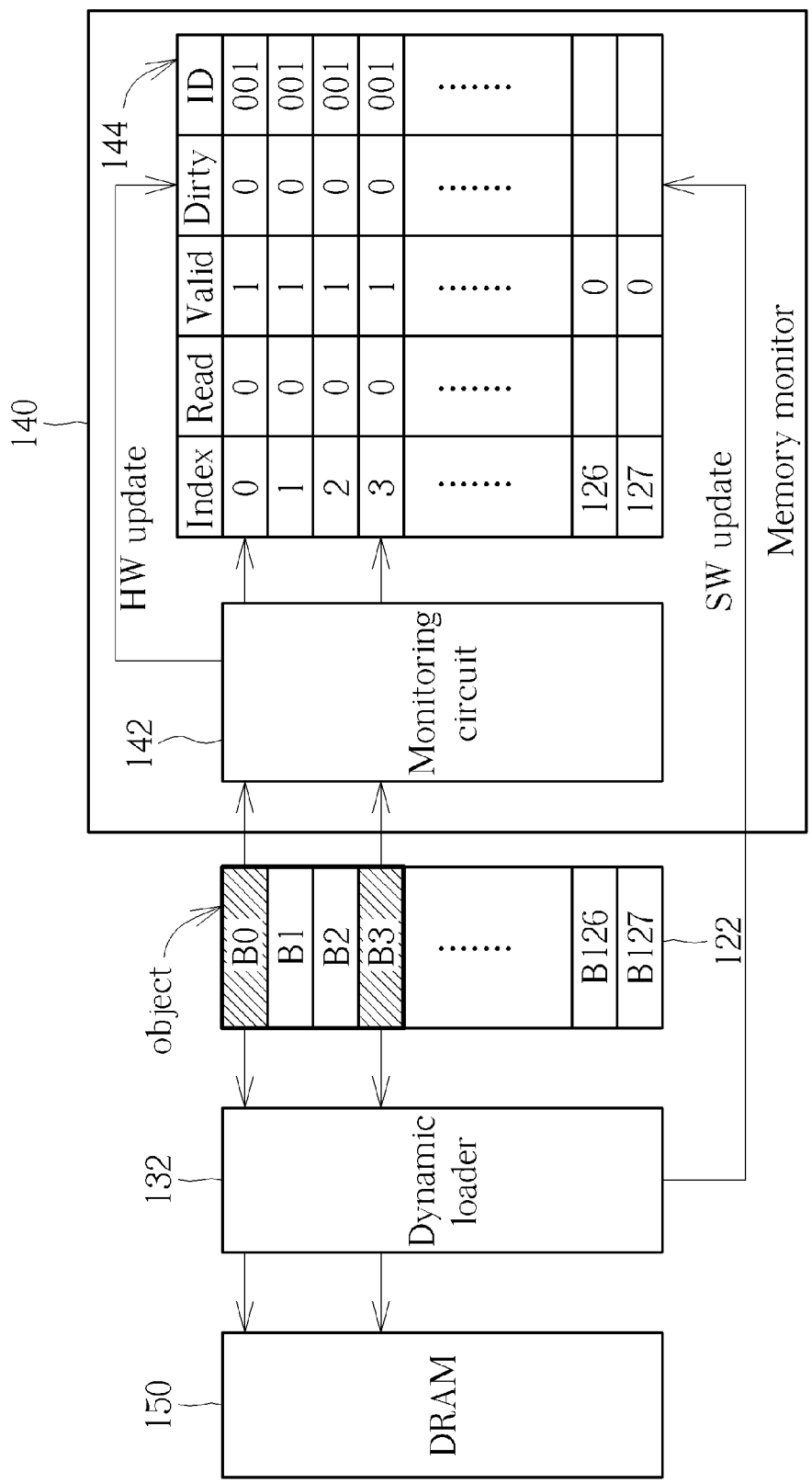
FIG. 6 is a diagram illustrating the operations of the dynamic loader and the memory monitor when the modified blocks B0 and B3 are written back to the DRAM according to one embodiment of the present invention.

FIG. 6 is a diagram illustrating the operations of the dynamic loader 132 and the memory monitor 140 when the modified blocks B0 and B3 are written back to the DRAM 150 according to one embodiment of the present invention. Referring to FIG. 5, after the CPU 110 finishes the execution, the dynamic loader 132 refers to the dirty information of the blocks B0-B3 to determine which blocks are modified, and the dynamic loader 132 only writes the modified blocks back to the DRAM 150, and the remaining blocks not modified are not written back. In this embodiment, the dynamic loader 132 only writes the modified blocks B0 and B3 back to the DRAM 150, without writing back all of the blocks B0-B3 . Meanwhile, the dirty information of the blocks B0 and B3 are updated from "1" to "0" by the monitoring circuit 142 or the dynamic loader 132, that is the monitoring circuit 142 may monitor/intercept the signals within the SRAM 120 to update the dirty information of the blocks B0 and B3, or the dynamic loader 132 may directly update the dirty information of the blocks B0 and B3 according to its internal information.

In the aforementioned embodiment shown in FIGS. 3-6, the hardware memory monitor 140 is used to monitor and record the dirty information that cannot be obtained by software cache (because the software cannot get the write/read signals from the CPU 110 to the SRAM 120). Therefore, the software dynamic loader 132 can know which block is modified by referring to the dirty information recorded by the hardware memory monitor 140, and the dynamic loader 132 will not write all of the object stored in the blocks B0-B3 back to the DRAM 150, and the quantity of data and the transmission overhead can be lowered to save power.

Figure 7:
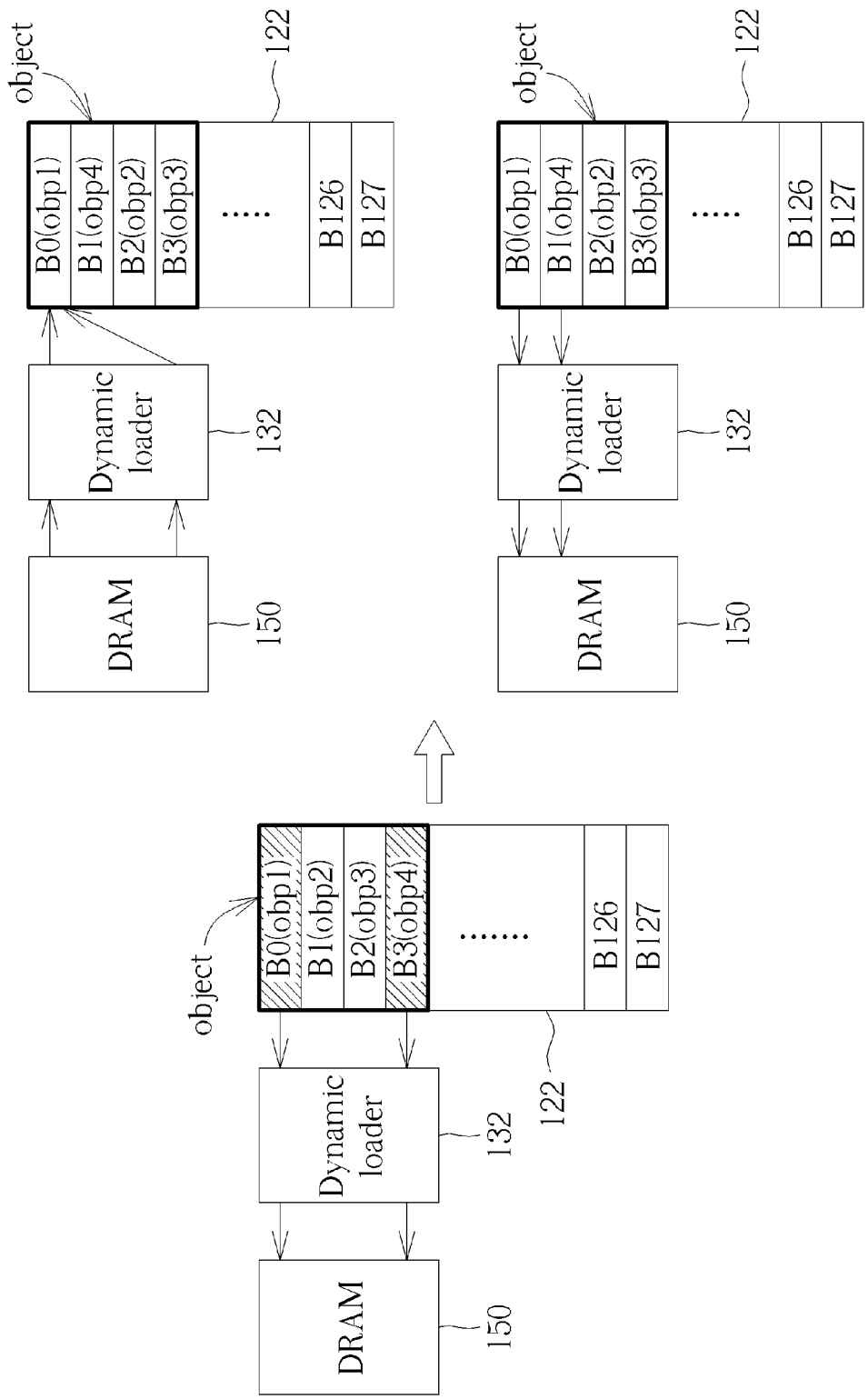
FIG. 7 is a diagram showing the block aggregation according to one embodiment of the present invention.

In addition, the dirty information of the blocks can be used for offline analysis. For example, the dynamic loader 132 can read the dirty information of blocks B0-B3 corresponding to the object having the ID "001" periodically or randomly or at a defined time, and the dynamic loader 132 can analyze the information to know which part(s) of the object is/are often updated, and the dynamic loader 132 can aggregate these parts together when the objected is loaded to working space 122 next time. Refer to FIG. 7, which is a diagram showing the block aggregation according to one embodiment of the present invention. As shown in FIG. 7, it is assumed that the blocks B0-B3 are corresponding to the object having four parts obp1-obp4, respectively, and only the blocks B0 and B3 (i.e. the parts obp1 and obp4) are written back to the DRAM 150, the dynamic loader 132 therefore can refer to the dirty information of the blocks B1-B3 to know which parts of the object are dirty and which parts of the object are not dirty. Next time when the object is required to be loaded to the working space 122 of the SRAM 120 again, the dynamic loader 132 can load the previous dirty parts (i.e. obp1 and obp4) of the object to the adjacent blocks B0 and B1, and the other parts (i.e. obp2 and obp3) are loaded to the blocks B2 and B3. Then, if the blocks B0-B3 are executed by the CPU 110 and the blocks B0 and B1 are updated, the dynamic loader 132 can write the updated data of the continuous blocks B0 and B1 back to the DRAM 150. Because wiring the continuous memory back to the DRAM 150 is faster, this embodiment can improve the efficiency of the microcontroller 100.

Similar to the embodiment shown in FIG. 7, the read information of the blocks can also be used for offline analysis. For example, the dynamic loader 132 can read the read information of blocks B0-B3 corresponding to the object having the ID "001" periodically or randomly or at a defined time, and the dynamic loader 132 can analyze the information to know which part (s) of the object is/are often read by the CPU 110, and the dynamic loader 132 can aggregate these parts together when the objected is loaded to working space 122 next time. Generally, because the CPU 110 does not read and execute all of the blocks B0-B3 corresponding to the object, aggregating the often read blocks together can enhance the executing speed.

Briefly summarized, in the memory management method and associated microcontroller, a hardware memory monitor is used to monitor and record at least the read information and the dirty information which cannot be obtained by software. Therefore, by referring to the read information and the dirty information provided by the hardware memory monitor, the software working space management unit (software cache) can manage the operations between the SRAM 120 and the DRAM 150 more efficiently. In conclusion, in the embodiments of the present invention, the microcontroller does not need the hardware cache circuit to save the manufacturing cost, and power consumption and computing resources of the software cache can be improved by using the hardware memory monitor having small size.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A microcontroller, comprising:
a processor;
a first memory having at least a working space, wherein the working space comprises a plurality of blocks;
a working space management unit, for managing the working space of the first memory; and
a memory monitor, implemented by hardware circuit, for monitoring the blocks, and recording monitoring results corresponding to the blocks of the first memory, wherein the recorded monitoring results comprise information about whether data of the plurality of blocks is modified or not;
wherein the working space management unit loads an object from a second memory to a portion of the plurality of blocks of the first memory, and the memory monitor monitors whether the data of the portion of the plurality of blocks is modified or not and records the monitoring results corresponding to the portion of the plurality of blocks, and the working space management unit refers to the monitoring results of the memory monitor to write only the plurality of block(s) whose data is modified back to the second memory.

2. The microcontroller of claim 1, wherein the working space management unit is implemented by software.

3. The microcontroller of claim 1, wherein the recorded monitoring results further comprise information about whether the plurality of blocks are read by the processor or not.

4. The microcontroller of claim 1, wherein the memory monitor comprises:
a monitoring circuit, for monitoring the plurality of blocks of the first memory; and a plurality of registers, coupled to the monitoring circuit, for storing and updating statuses of the plurality of blocks according to the monitoring results of the monitoring circuit.

5. The microcontroller of claim 4, wherein the status of each of the plurality of blocks comprises at least read information and dirty information, the read information indicates that whether each of the plurality of blocks is read by the processor or not, and the dirty information indicates that whether the data of the block is modified or not.

6. The microcontroller of claim 5, wherein the status of each of the blocks further comprises valid information, and the valid information indicates that whether the plurality of block is empty or not.

7. The microcontroller of claim 5, wherein the working space management unit loads an object from a second memory to a portion of the plurality of blocks of the first memory, the processor subsequently executes a portion of the object, and the monitoring circuit monitors the plurality of blocks of the first memory to update the dirty information of the portion of the plurality of blocks, and the working space management unit refers to the updated dirty information of the blocks to write only the plurality of block(s) whose data is modified back to the second memory.

8. The microcontroller of claim 7, wherein the each of the read information, the dirty information and the valid information of the plurality of block is represented by a bit, and the second memory has larger chip area, slower speed and/or higher power consumption than the first memory.

9. The microcontroller of claim 7, wherein the working space management unit refers to the updated dirty information of the portion of the plurality of blocks to know which parts of the object are modified; and next time when the working space management unit loads the object from the second memory to the first memory again, the working space management unit arranges the previous modified parts of the object in continuous blocks of the first memory.

10. The microcontroller of claim 5, wherein the working space management unit loads an object from a second memory to a portion of the plurality of blocks of the first memory, the processor subsequently read a portion of the object, and the monitoring circuit monitors the plurality of blocks of the first memory to update the read information of the portion of the plurality of blocks; and the working space management unit refers to the updated read information of the portion of the plurality of blocks to know which parts of the object are read by the processor; and next time when the working space management unit loads the object from the second memory to the first memory again, the working space management unit arranges the parts, previously read by the processor, of the object in continuous blocks of the first memory.

11. A method for managing a first memory, wherein the first memory has at least a working space comprising a plurality of blocks, and the method comprises:
using a hardware circuit to monitor the plurality of blocks; and
recording monitoring results corresponding to the blocks of the first memory, wherein the recorded monitoring results comprise information about whether data of the plurality of blocks is modified or not and
loading an object from a second memory to a portion of the blocks of the first memory; using the hardware circuit to monitor whether the data of the portion of the plurality of blocks is modified or not; recording the monitoring results corresponding to the portion of the blocks; and referring to the monitoring results to write only the plurality of block(s) whose data is modified back to the second memory.

12. The method of claim 11, further comprising: using software to manage the plurality of blocks of the first memory.

13. The method of claim 11, wherein the recorded monitoring results further comprise information about whether the plurality of blocks are read by a processor or not.

14. The method of claim 11, wherein the step of recording the monitoring results corresponding to the blocks of the first memory comprises: storing and updating statuses of the plurality of blocks according to the monitoring results into a plurality of registers.

15. The method of claim 14, wherein the status of each of the blocks comprises at least read information and dirty information, the read information indicates that whether each of the plurality of blocks is read by the processor or not, and the dirty information indicates that whether the data of the block is modified or not.

16. The method of claim 15, wherein the status of each of the plurality of blocks further comprises valid information, and the valid information indicates that whether the block is empty or not.

17. The method of claim 14, further comprising: loading an object from a second memory to a portion of the plurality of blocks of the first memory; executing a portion of the object; monitoring the plurality of blocks of the first memory to update the dirty information of the portion of the plurality of blocks; and referring to the updated dirty information of the blocks to write only the plurality of block(s) whose data is modified back to the second memory.

18. The method of claim 17, further comprising: next time when the working space management unit loads the object from the second memory to the first memory again, referring to the updated dirty information of the plurality of blocks to arrange the previous modified parts of the object in continuous blocks of the first memory.

* * * * *